United States Patent [19]

Baker et al.

[11] Patent Number: 4,922,144
[45] Date of Patent: May 1, 1990

[54] ROTOR ASSEMBLY STRUCTURE

[75] Inventors: Gerald N. Baker; Ray E. Bushor, both of St. Louis County, Mo.

[73] Assignee: Emerson Electric Co., St. Louis, Mo.

[21] Appl. No.: 325,398

[22] Filed: Mar. 20, 1989

Related U.S. Application Data

[62] Division of Ser. No. 222,033, Jul. 21, 1988, Pat. No. 4,843,705.

[51] Int. Cl.$^5$ .............................................. H02K 7/08
[52] U.S. Cl. ...................................... 310/42; 29/598; 310/90
[58] Field of Search .................................. 310/90, 42; 164/DIG. 10, 110; 29/598

[56] References Cited

U.S. PATENT DOCUMENTS

| 4,209,722 | 6/1980 | Peachee, Jr. | 310/90 |
| 4,499,661 | 2/1985 | Peachee, Jr. | 29/598 |

Primary Examiner—Carl E. Hall
Attorney, Agent, or Firm—Polster, Polster and Lucchesi

[57] ABSTRACT

A method and apparatus for making a rotor assembly for an electric motor wherein the rotor core of the assembly includes a stack of annular laminations having fixed molded annular end rings on opposed faces thereof with a rotor shaft extending through the core and fixed thereto by a molded rotor hub shaped in cup-like fashion at one end thereof to cooperate in forming an oil return member therewith.

13 Claims, 4 Drawing Sheets

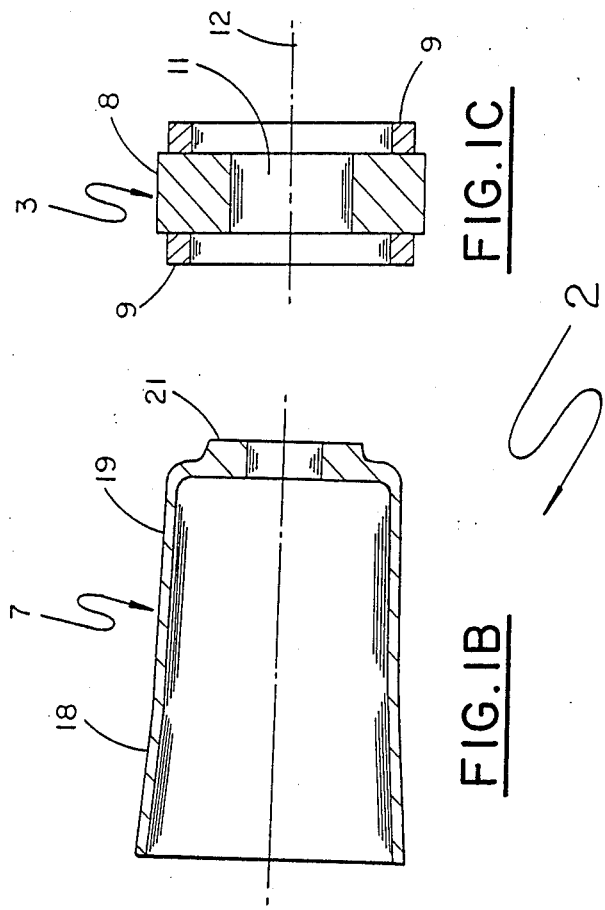
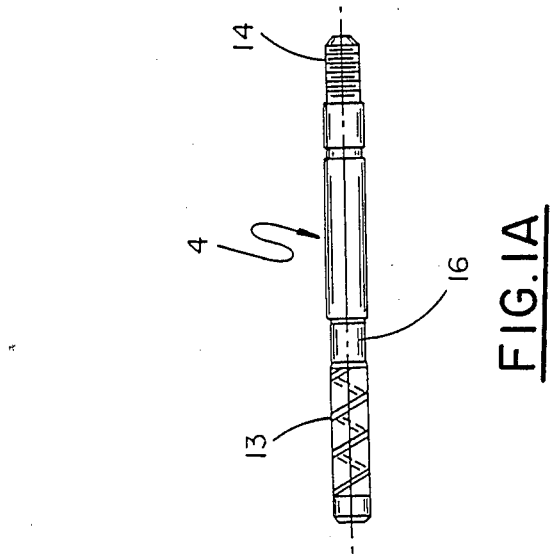

ROTOR ASSEMBLY STRUCTURE

This is a divisional of copending application Ser. No. 07/222,033, filed on 07/21/88, now U.S. Pat. No. 4,843,705.

BACKGROUND OF THE INVENTION

The present invention relates to a method of manufacturing a rotor assembly for an electric motor and an improved rotor assembly which includes a novel molded rotor core and a novel manner of molding and assembling such rotor core with a rotor shaft extending therethrough, including a unique arrangement for an oil return tube.

As is set forth in both prior coassigned U.S. Pat. Nos. 4,209,722, and 4,499,661, both issued to C. Theodore Peachee, Jr., on June 24, 1980, and Feb. 15, 1985, respectively, in certain dynamoelectric machines of the induction motor type, and particularly in many smaller motors sometimes referred to as unit bearing motors, the motors have a squirrel cage rotor assembly in which the conductor bars for the rotor and the end rings of the rotor are made of die cast aluminum. Typically, these rotor assemblies include a stack or rotor core of individual laminations constructed from suitable ferro-magnetic material. Each lamination has a central opening and a plurality of satellite openings or slots adjacent its outer margin. The laminations are assembled in a stack and the laminations are rotated slightly with respect to one another in the stack so that their central openings are coaxial but so that their slots are skewed relative to one another and so that the slots constitute passages. The lamination stack or core is then placed in a suitable die casting mold and molten aluminum is injected under pressure into the mold to fill the mold, to flow through the skewed passages in the core formed by the slots so as to form the conductor bars of the rotor and to form the rotor end rings. These die cast squirrel cage rotors typically have a central opening therethrough and a rotor shaft extending through this opening which is rigidly secured to the rotor so that the shaft rotates with the rotor. This central opening may be defined at least in part by the central opening of the laminations and is appreciably larger than the shaft so as to receive a rigid boss of the motor housing. The rotor shaft is received in an opening in the boss and is journalled therein by a suitable journal bearing or the like so as to rotatably support the rotor on the motor housing. As is typical, a portion of the rotor shaft journalled in the bearing has a helical oil groove formed on its outer surface and the outer end of the shaft rotates in a felt wick supplied with lubricating oil from a reservoir. Upon rotation of the rotor, the oil grooves in the shaft pick up oil from the wick and move it along the length of the bearing to lubricate it. Upon the oil being discharged from the inner end of the bearing, it is slung outwardly by the centrifugal force of the rotating rotor shaft.

In prior art motors having such rotors, a return system was provided for recirculating the oil to the oil supply reservoir. This oil return system typically included a tubular oil return member which was fitted into the opening in the rotor after die casting. This oil return member surrounded the bearing boss and extended out beyond the end of the rotor. The inner end of this oil return member was sealed to the rotor body by application of a sealant. An outer end cap carried by the motor housing surrounded the outer end of the oil return member and collected oil which flowed out of the end of the oil return member from the inside of the rotor.

In the manufacture of these prior art die cast squirrel cage rotors, it has heretofore been difficult to fit the oil return member into the rotor body and to seal the inner end of the oil return member to the rotor body. As mentioned above, the sealing operation usually involved the application of a sealant to the joint between the inner end of the oil return member and the rotor body. However, many of the motors which incorporated these die cast squirrel cage rotors were relatively small and the space in which the sealant had to be applied was cramped. Also, the application of sealant was a messy and time-consuming operation performed after die casting of the rotor thus resulting in increased labor costs for the manufacture of the motor.

In prior coassigned U.S. Pat. No. 4,209,722, a die cast rotor is disclosed in which a tubular oil return member is sealably die cast-in-place within the rotor body. However, this die cast-in-place oil return member was separate and apart from a securement member which was also die cast-in-place within the rotor body, this securement member receiving and rigidly securing the rotor shaft to the rotor body. Typically, this rotor shaft securement member was made of brass. During die casting of the rotor, it was necessary to separately locate or place both the oil return tube and the rotor shaft securement member in the die cavity of the die casting machine. The placement of these two parts required a certain degree of skill and time on the part of the operator of the die casting machine.

In prior coassigned later U.S. Pat. No. 4,499,661, the oil return tube and rotor shaft mounting member are integrally formed as one piece by cold extrusion and inserted within the central opening of a rotor core including a lamination stack. Molten metal is then die cast around the one piece oil return and rotor shaft mounting member and around the core, and the rotor shaft is then fixedly secured to the rotor shaft mounting member of the extruded integral piece. This later U.S. Pat. No. 4,499,661 enhanced rotor assembly over the previous teachings in the art, eliminating assembly parts with the oil return tube serving as a locater for the rotor core in assembly operations, providing an economical way to manufacture the rotor assembly with reduced scrap and with reliable operation.

The present invention provides a new and useful method of manufacture and a unique structural rotor assembly which can be produced by an even more straightforward and efficient series of manufacturing steps, and which provides a rotor assembly of even greater reliability in operation, further extending the life of the motor in which it is employed. In this regard, the present invention provides a novel method and rotor assembly arrangement which provides for an optimization of resistance control in the rotor assembly with a minimum of molten materials through a comparatively simple, straightforward series of manufacturing steps, including a unique, straightforward assembly step with respect to the oil return tube and which, at the same time, provides for efficient oil distribution operations with a tight seal between the several parts of the assembly. In addition, the unique method and apparatus of the present invention, recognizing the undesirability of oil losses, minimizes the porosity of those parts which are contacted with oil and, at the same time, ensures effective recycling of such oil with a minimum of sealing parts. Further, the present invention permits for a reduction in costly secondary machining operation and also allows for the selective scrapping of parts which might appear to be defective during manufacturing quality inspection procedures.

Various other advantageous features of the present invention will become obvious to one skilled in the art upon reading the disclosure set forth herein.

SUMMARY OF THE INVENTION

More particularly, the present invention provides an improved rotor assembly arrangement for an electric motor comprising: a rotor core including a stack of annular laminations of suitable ferro-magnetic materials with annular end rings in fixed molded relation with opposed faces of the stack of annular laminations to define a longitudinally extending rotor core opening therethrough and provide a longitudinal axis of rotation about which the rotor core is rotatable; a rotor shaft extending through the rotor core opening along the longitudinal axis of rotation; a rotor hub molded within the rotor core opening in fixed relation to the stack of annular laminations and the rotor shaft with one end of the molded rotor hub having a cup-like opening therein with the base of the cup-like opening being molded in fast relation around the rotor shaft; and, a tubular open-ended oil return member cooperatively disposed relative and in alignment with the cup-like opening in the rotor hub to surround the rotor shaft in spaced relation thereto. In addition, the present invention provides a unique oil return tube or cap arrangement which can be either integrally molded as part of the cup-like opening in the rotor hub or can be formed from a non-porous material such as a high modulus plastic sized and shaped to be press-fit into nesting, sealed relation with the cup-like opening of the rotor hub and surrounding the rotor shaft. Further, the present invention provides for a molded rotor hub arrangement which allows for an end of the rotor shaft to be embedded therein or alternatively to project therethrough. Further, the present invention provides a unique and novel method of manufacturing a rotor assembly for an electric motor such as one like the unique rotor assembly above described including the steps of forming the rotor core by molding annular end rings along opposed faces of the stack of annular laminations; inserting and supporting the shaft in concentrically spaced relation from the inner peripheral wall of the stack of annular laminations so that the longitudinal axis of the shaft extends along the central axis of rotation of the rotor assembly; molding a rotor hub between such inner peripheral wall of the stack of annular laminations and the concentrically supported rotor shaft to fix the rotor core to lamination stack and the rotor shaft, the rotor hub being molded to include a cup-like opening with the mouth therefore at one end thereof for concentric cooperative relation with an oil return tube; and, forming such oil return tube or cap sized and configured to be in such concentric cooperation with the cup-like opening formed in the rotor hub.

It is to be understood that various changes can be made by one skilled in the art in one or more of the several steps of the inventive method described herein and in one or more of the several parts of the novel structure disclosed herein without departing from the scope or spirit of the present invention.

BRIEF DESCRIPTION OF THE DRAWINGS

Referring to the drawings which disclose an advantageous embodiment of the inventive rotor assembly arrangement, a modification thereof, and a schematic flow diagram of the inventive method:

FIGS. 1A through 1C are exploded views partially in cross section, of the inventive rotor shaft, oil return tube and rotor core;

DETAILED DESCRIPTION OF THE DRAWINGS

Figure 2:
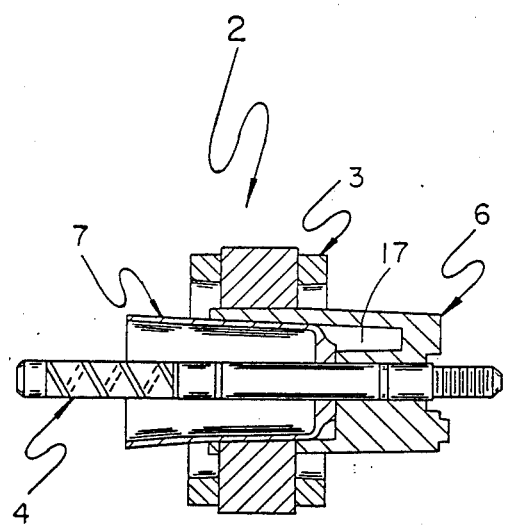
FIG. 2 is an assembled cross-sectional side view of the rotor assembly including the several parts of FIG. 1 and a rotor hub extending between the rotor core and rotor shaft.

As can be seen in FIGS. 1 and 2 of the drawings, the inventive rotor assembly 2 shown in the assembled arrangement in FIG. 2 comprises a rotor core 3, a rotor shaft 4, a rotor hub 6 (FIG. 2) and a tubular open-ended oil return member 7, the shaft 4, oil return member 7 and a rotor core 3 being shown in exploded, unassembled form in FIG. 1.

As can be seen in the drawings, rotor core 3 includes a stack of annular laminations 8 which can be punch-formed from sheets of suitable ferro-magnetic material and assembled and joined in a manner as above-described. Specifically, the punched laminations, each having a central opening and a plurality of outer peripheral slots, are assembled in a stack and rotated slightly with respect to one another in the stack so that the central openings are coaxial to define an inner peripheral wall and the outer peripheral slots are skewed relative to one another to provide skewed passages in the core. Molded aluminum can then be injected under pressure into the skewed passages to form the conductor bars of the rotor. Annular end rings 9 are fixed, advantageously by die cast molding, to the opposed faces of the stack of laminations 8. These annular end rings, like the conductor bars in the skewed peripheral passages, can be die cast from aluminum, and are sized and shaped in a preselected manner relative to the stack of annular laminations 8 to provide a preselected controlled rotor resistance with the stack of annular laminations, the annular rings 9 and inner peripheral wall of the stack of annular laminations 8 defining a longitudinally extending rotor core opening 11 therethrough to provide a longitudinal axis of rotation 12 about which rotor assembly 2 can be rotated.

Rotor shaft 4, which can be cut and shaped from a suitable material such as a bar stock of cold rolled steel, can be provided at one end portion thereof with a helical oil groove 13 and at the opposite end portion thereof with a threaded end 14. As is known in the art, a suitable longitudinally extending undercut portion 16 can be provided on rotor shaft 4, intermediate helical groove 13 and threaded end 14. Rotor shaft 4 is positioned within rotor core opening 11 to extend longitudinally in spaced relation through such rotor core opening with its longitudinal axis defining the aforementioned rotor assembly axis of rotation 12.

As can be seen in FIG. 2 of the drawings, the rotor hub 6 is molded from a suitable material, such as die cast zinc or high modulus plastic within rotor core opening 5 in fixed relation to the inner peripheral wall of the rotor core 4 defined by the stack of annular laminations 8 and the outer periphery of rotor shaft 4. As will be noted in FIG. 2, threaded end 14 of rotor shaft 4 can be arranged to extend beyond molded rotor hub 6 to engage in male-female relation with a central aperture in a fan blade to be mounted on the threaded end 14 with an internally threaded nut (not shown). The opposite end of molded rotor hub 6 is provided with a cup-like opening in the form of a substantially cylindrical open-ended passage 17 with the base molded in fast relation around the outer periphery of rotor shaft 4 as above discussed.

Tubular open-ended oil return member 7 can be cooperatively disposed relative and in alignment with cup-like opening 17 in rotor hub 6 to surround the rotor shaft in spaced concentric relation therewith.

As disclosed in FIGS. 1 and 2 of the drawings, oil return member 7 can be formed separately in unitary fashion from a suitable non-porous material, such as a high modulus plastic, to include a tapered mouth portion 18 which tapers inwardly from the open end thereof to a substantially cylindrical body portion 19 which includes an apertured base 21. The cylindrical body portion 19 with its apertured base 21 is cross-sectionally and longitudinally sized to snugly nest with open-ended cylindrical passage 17, with apertured base 21 snugly embracing the outer periphery of rotor shaft 4 and abutting the base of cylindrical passage 17 in rotor hub 6 when tubular oil return member 7 is press-fit therein. In this regard, it is to be noted that cylindrical body portion 19 and apertured base 21 of oil return member 7 can be of sufficient length and breadth respectively to ensure projection of tapered mouth portion 18 beyond the open-ended mouth of the cup-like cylindrical passage 17 in rotor hub 6.

Figure 3:
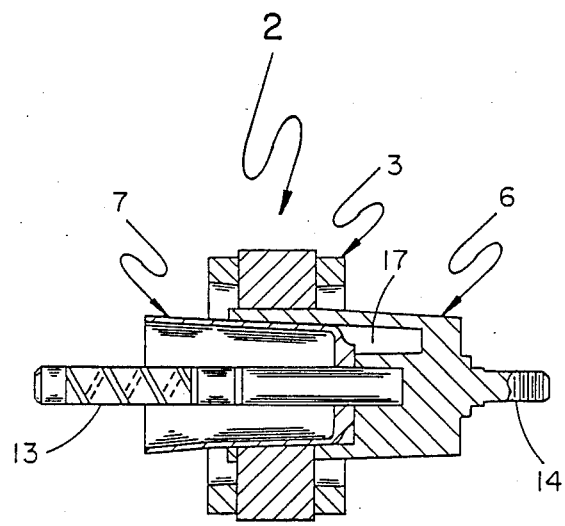
FIG. 3 is an assembled cross-sectional side view, similar to the view of FIG. 2, of a modified rotor assembly disclosing a rotor shaft end embedded in the rotor hub which hub is provided with a threaded end protrusion aligned with the rotor shaft axis.

It is to be understood, as shown in FIG. 3 of the drawings, that rotor shaft 4 can be embedded in molded rotor hub 6 with hub 6 being so molded as to include an externally male threaded projection 22 in alignment with rotor shaft 4 to receive the central aperture of a fan blade not shown) and an internally threaded nut for mounting and retaining such blade. It is further to be understood that it also would be possible in accordance with the present invention to mold tubular oil return member 7 as an integral part of rotor hub 6. In such event, it only would be necessary to provide a tapered mouth portion substantially of the configuration of mouth portion 18 only extending outwardly from the outer periphery of the mouth cf cylindrical opening 17 in rotor hub 6.

Figure 4:
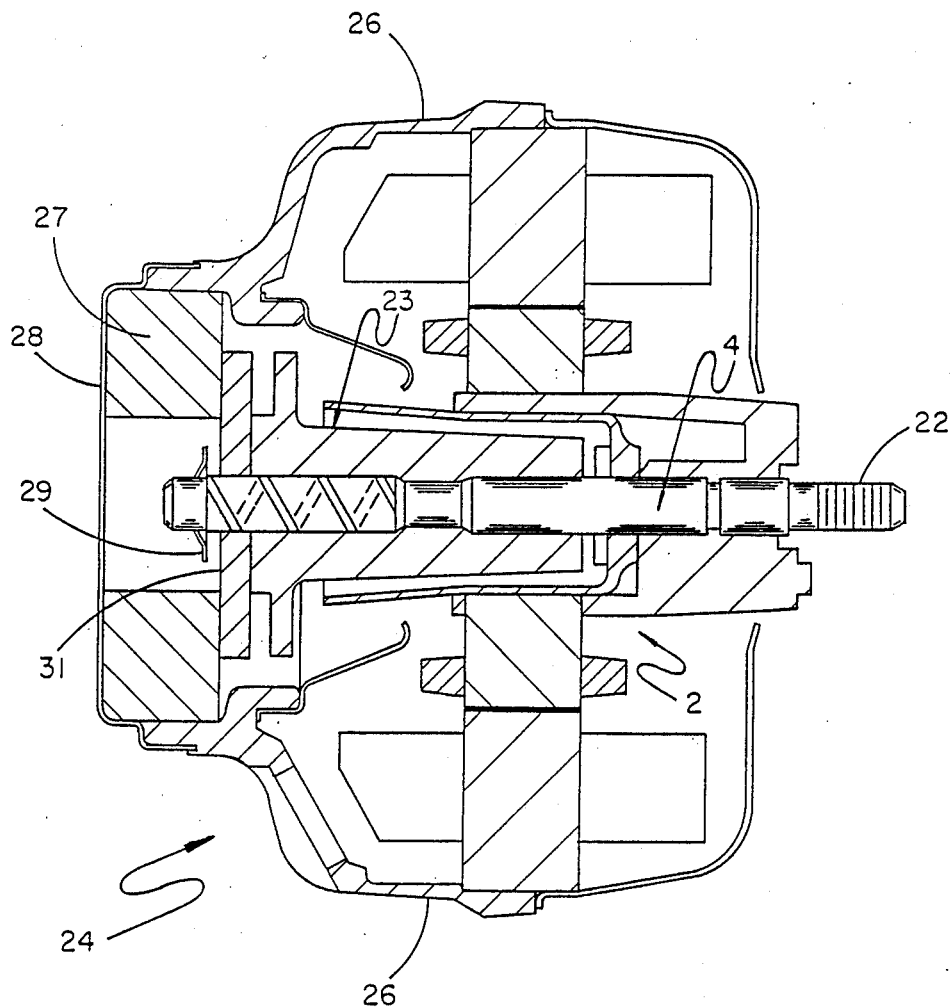
FIG. 4 is a cross-sectional side view of a motor incorporating the rotor assembly of FIG. 2; and, FIG. 5 is a schematic flow diagram setting forth the several steps of the inventive method.

Referring to FIG. 4 of the drawings, the inventive rotor assembly 2 is disclosed with the rotor shaft 4 in engagement with a central bearing boss 23 extending inwardly from motor 24. Boss 23 is rigid and serves as a support for shaft 4 to provide the unit bearing motor 24, the boss 23 and outer housing 26 thereof being of a suitably molded configuration similar to the motor arrangement in aforediscussed U.S. Pat. No. 4,209,722. Accordingly, functional details of storage wick 27, cap 28, push nut 29 on rotor shaft 4, and washer wick 31 are not fully described herein. It is to be noted, however, that due to the unique pressfit or integral relation of the oil return tube 7, the thrust washer and spacer washer which had been required with the rotor hubs in previous rotor assemblies have now been eliminated, reducing material and assembly costs and simplifying motor operations.

Figure 5:
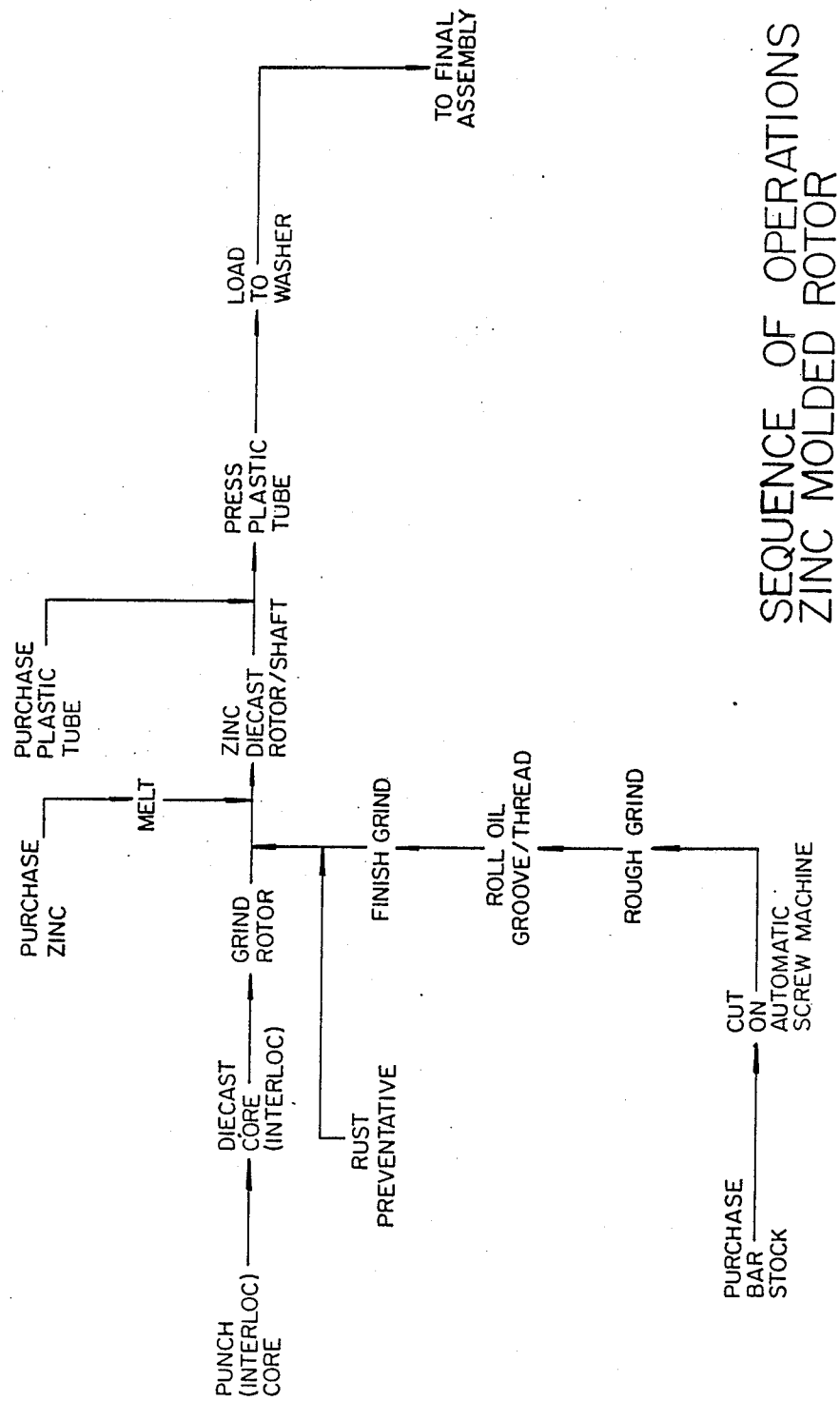

Referring to FIG. 5 of the drawings, a schematic diagram of the inventive method steps is disclosed. This method includes the steps of forming a rotor core 3 by punching a plurality of annular laminations from a sheet of suitable ferro-magnetic material with each lamination having a central opening and a plurality of outer slots. The annular laminations are then assembled in a stack so that the central openings are coaxial to define an inner peripheral wall surrounding rotor core opening 11, and the outer peripheral slots are skewed to provide skewed passages. With the laminations supported in this manner as a stack of laminations 8, the skewed passages are die cast with molten aluminum under pressure to form the conductor bars in the lamination stack 8 of rotor core 3 along with a pair of annular rings 9 sized and shaped in a preselected form, advantageously of trapezoidal cross-section, being then die cast simultaneously from such molten aluminum under pressure on opposite faces of the stack. These annular rings 9 are of preselected size and shape to control resistance in the rotor core 3. The rotor core 3 then is appropriately ground to desired tolerance, removing burrs and edges from the core. Substantially, at the same time that core 3 is formed in the manner described, rotor shaft 4 can be cut and shaped from selected bar stock material, such as cold rolled steel, to include an intermediate undercut section 16. The shaft is then rough ground and rolled to include at one end portion thereof along the outer periphery thereof a helical oil groove 13 to extend from one extremity thereof to the undercut section or portion 16 and an externally threaded portion 14 is rolled at the opposite extremity of shaft 4.

The shaped and rolled shaft 4 can then be inserted and supported through central opening 11 defined by the inner peripheral wall of the stack of annular laminations 8 so as to be in concentrically spaced relation from such wall within the longitudinal axis of shaft 4 defining and extending along the central axis of rotation of rotor core 3.

Rotor hub 6 is then die cast under suitable pressure from an appropriate zinc or high modulus plastic material to extend between the inner peripheral wall of the stack of annular laminations 8 and the periphery of the concentrically supported rotor shaft 4. The threaded end 14 of shaft 4 is arranged to extend externally from the die cast material to provide a fan mount. In this regard, it is to be understood that such end of rotor shaft 4 can be embedded in the rotor hub 6 and the rotor hub so die cast as to include a threaded external projection 15 extending in axial alignment with shaft 4 to provide such fan mount (FIG. 3). It is to be noted that rotor hub 6 also is so die cast as to include a cup-like opening at the end thereof opposite the fan mount. This opening can be of substantially cylindrical shape to nestingly receive a portion of the oil return tube 7 therein.

The oil return tube 7, which can be formed from a suitable non-porous, high modulus plastic, is formed to include outwardly flanged mouth portion 18 and cylindrical body portion 19 terminating in an apertured base member 21. In forming tube 7, the tube portions are so sized along their lengths and cross-sections that when tube 7 is press-fit into the cylindrical opening 17 of rotor hub 6 the cylindrical body portion 19 sealingly nests therein with base 21 abutting the base of the cup-like opening 17 and the aperture in base 21 snugly embracing rotor shaft 4 with the shaft 4 extending in concentric relation with cylindrical body portion 19 of tubular oil return member 7 and flange or tapered mouth portion 18 concentrically surrounding helical groove 13 and adjacent undercut section 16 of shaft 4.

Thus, a novel, straightforward, economical and reliably operating rotor assembly structure can be formed by a novel method with a minimum of cost, steps, and parts.

The invention claimed is:

1. A rotor assembly for an electric motor comprising;
   a rotor core including a stack of annular laminations of suitable ferro-magnetic materials with a pair of annular end rings in fixed and molded relation with opposed faces of said stack of annular laminations to define a longitudinally extending rotor core opening therethrough and provide a longitudinal axis of rotation about which said rotor core is rotatable;
   a rotor shaft extending through said rotor core opening along said longitudinal axis of rotation;
   a rotor hub molded within said rotor core opening in fixed relation to said stack of annular laminations and said rotor shaft with one end of said molded rotor hub having a cup-like opening therein with the base of said cup-like opening being molded in fast relation around said rotor shaft; and,
   a tubular, open-ended oil return member cooperatively disposed relative and in alignment with said cup-like opening of said rotor hub to surround said rotor shaft in spaced relation thereto.

2. The rotor assembly of claim 1, said tubular, open-ended oil return member being of a preselected unitary plastic material.

3. The rotor assembly of claim 1, said tubular, open-ended oil return member being of cup-like shape with an apertured base sized and shaped to be press-fit into nesting relation with said cup-like opening of said rotor hub surrounding said rotor shaft in sealed relation with said opening and shaft.

4. The rotor assembly of claim 1, said tubular open-ended oil return member being integrally molded to extend from the mouth of said cup-like opening of said rotor hub.

5. The rotor assembly of claim 1, said tubular open-ended oil return member being of cup-like shape to include an apertured base which snugly embraces the outer periphery of said rotor shaft in nesting relation therewith, with the base of said tubular open-ended cup-like oil return member abutting the base of said cup-like opening in said rotor hub; said base of said tubular open-ended cup-like oil return member being of sufficient breadth to ensure projection of a preselected portion adjacent the open-ended mouth thereof to extend beyond the mouth of the cup-like opening in said rotor hub.

6. The rotor assembly of claim 1, said rotor hub being a die cast zinc material.

7. The rotor assembly of claim 1, said rotor hub being a molded high modulus plastic material.

8. The rotor assembly of claim 1, said oil return member being of the same molded material as said hub.

9. The rotor assembly of claim 1, said rotor shaft having its opposite end terminating in said rotor hub, said hub having a threaded projection extending externally therefrom in alignment with the longitudinal axis of said shaft to provide a fan mount.

10. The rotor assembly of claim 1, said rotor shaft having its opposite end terminating externally of said rotor hub, said end being threaded to provide a fan mount.

11. The rotor assembly of claim 1, said annular end rings engaging said stack of annular laminations being of preselected size and shape to provide a preselected controlled rotor resistance.

12. The rotor assembly of claim 1, said annular end rings being of die cast aluminum alloy.

13. A rotor assembly for an electric motor comprising a rotor core including a stack of annular laminations of suitable ferro-magnetic materials having a pair of annular aluminum end rings of preselected cross-section in fixed die cast relation thereto to opposite sides thereof, said annular end rings being sized and shaped in a preselected manner relative said stack of annular laminations to provide a preselected controlled rotor resistance with said stack of annular laminations and said annular end rings defining a longitudinally extending rotor core opening therethrough to provide a longitudinal axis of rotation about which said rotor assembly is rotatable;
   a rotor shaft extending longitudinally in spaced relation through said rotor core opening along said longitudinal axis of rotation;
   a zinc rotor hub die cast within said rotor core opening in fixed relation to the peripheral inner wall of said stack of annular laminations and a portion of one end of said rotor shaft, said die cast rotor hub having a cup-like substantially cylindrical open-ended passage therein with the base of said cylindrical cup-like passage being die cast around said portion of said end of said rotor shaft;
   a unitary non-porous plastic tubular open-ended cup-like oil return member including a tapered mouth portion tapering inwardly from the open end thereof and a substantially cylindrical integral body portion having an apertured base, said body portion and base being sized to snugly nest within the opening of said rotor hub with the apertured base sealingly embracing the outer periphery of said rotor shaft and abutting said base of said cylindrical cup-like passage in said rotor hub when press-fit therein, said base of said cylindrical portion of said cup-like oil return member being of sufficient breadth to ensure projection of said tapered mouth portion thereof to extend beyond the open-ended mouth of said cylindrical cup-like opening in said rotor.

* * * * *